(No Model.)  3 Sheets—Sheet 1.

F. P. HOWARD.
CORN PLANTER.

No. 445,557. Patented Feb. 3, 1891.

Witnesses.
Wm. M. Ernst
M. Foscher

Inventor:
Frank P. Howard
By William R. Baird
Atty.

(No Model.) 3 Sheets—Sheet 2.

F. P. HOWARD.
CORN PLANTER.

No. 445,557. Patented Feb. 3, 1891.

Witnesses.
Wm. M. Ernst
M. Doscher

Inventor.
Frank P. Howard
By William R. Baird
Atty.

(No Model.) 3 Sheets—Sheet 3.

F. P. HOWARD.
CORN PLANTER.

No. 445,557. Patented Feb. 3, 1891.

Witnesses.
Wm. M. Ernst
M. Dorcher

Inventor.
Frank P. Howard
By William R. Baird
Att'y.

UNITED STATES PATENT OFFICE.

FRANK P. HOWARD, OF BRIDGTON, MAINE, ASSIGNOR OF ONE-HALF TO MELLEN A. PINGREE, OF SAME PLACE.

CORN-PLANTER.

SPECIFICATION forming part of Letters Patent No. 445,557, dated February 3, 1891.

Application filed October 16, 1889. Serial No. 327,201. (No model.)

*To all whom it may concern:*

Be it known that I, FRANK P. HOWARD, a citizen of the United States, residing at Bridgton, Cumberland county, State of Maine, have invented certain new and useful Improvements in Corn-Planters; and I do hereby declare that the following is a full, clear, and exact description of the invention, which, with the accompanying drawings and the letters marked thereon and referred to in the said description, is such as will enable others skilled in the art to which it appertains to make and use the same.

My invention relates to corn-planters; and its novelty consists in the construction and adaptation of the parts, as will be more specifically hereinafter pointed out in the claims.

Figure 1:
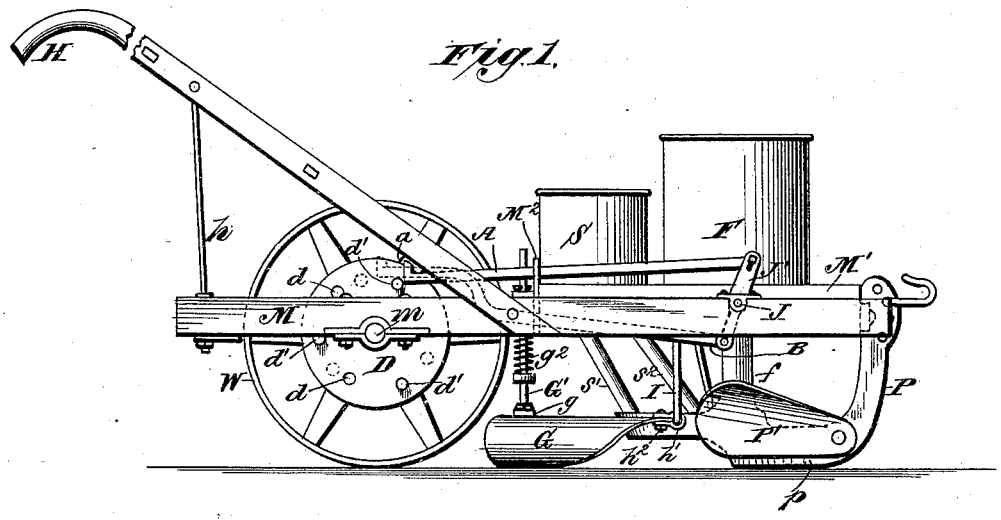
Figure 2:
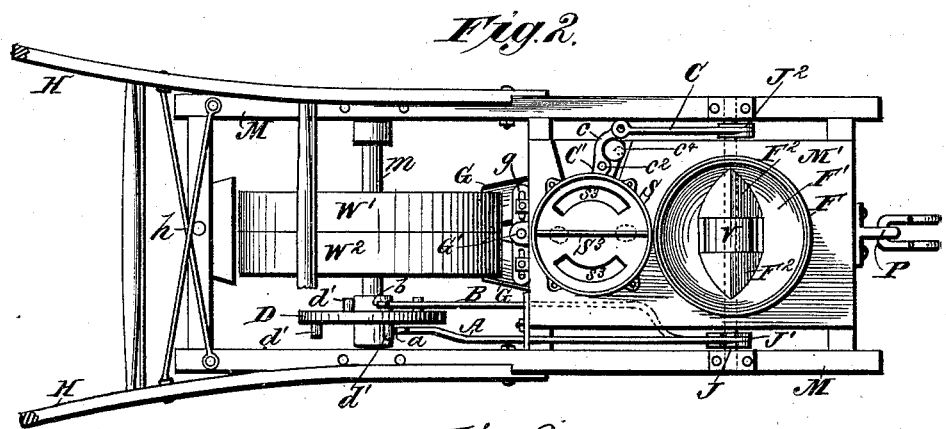
Figure 3:
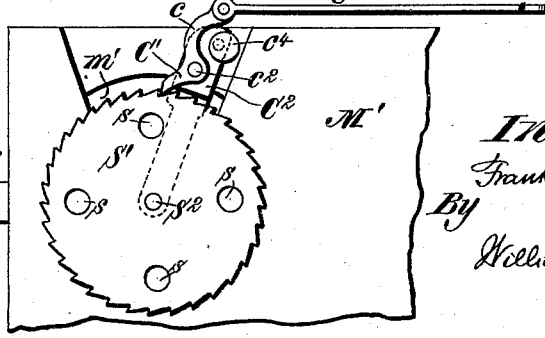
Figure 4:
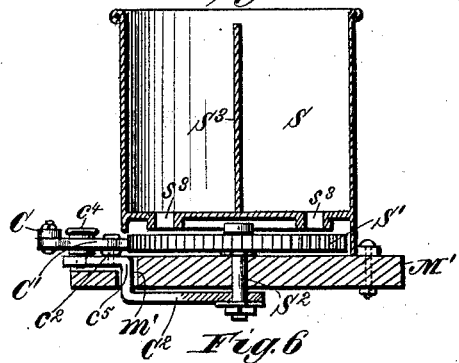
Figure 5:
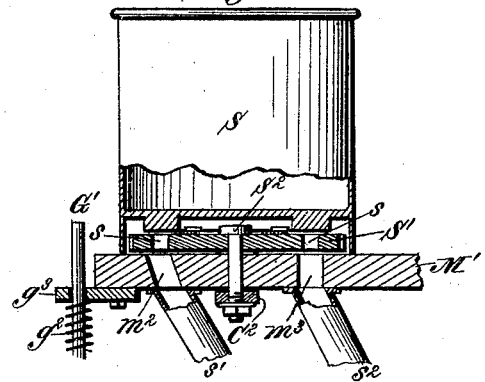
Figure 6:
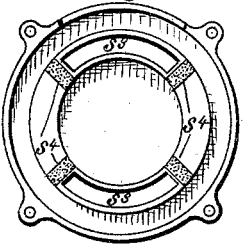
Figure 7:
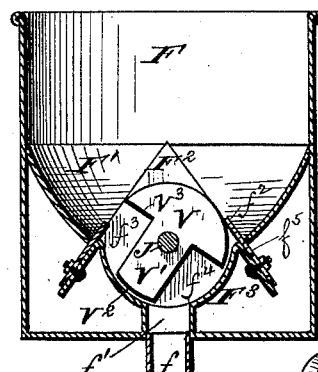
Figures 8, 9:
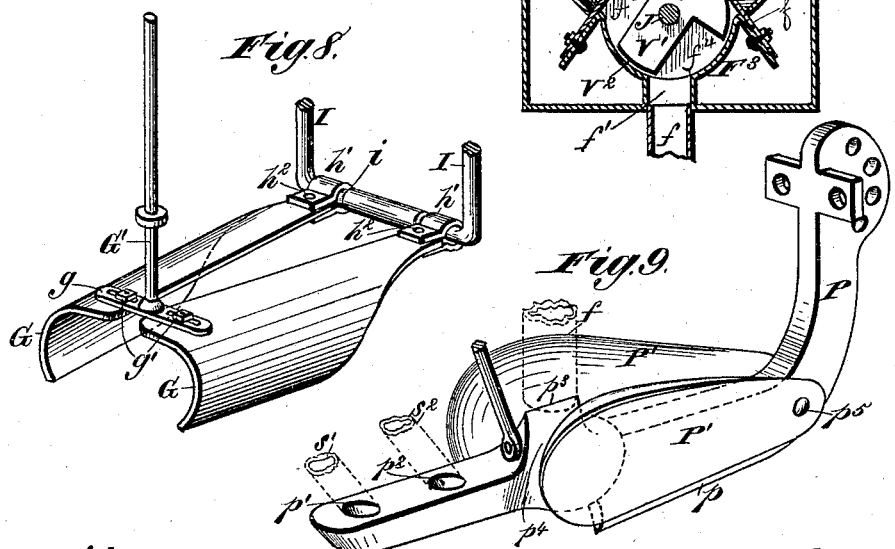
Figure 10:
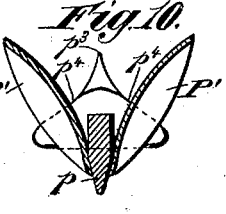
Figure 11:
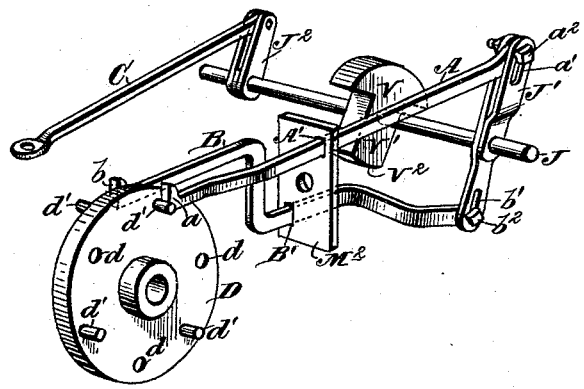
Figure 12:
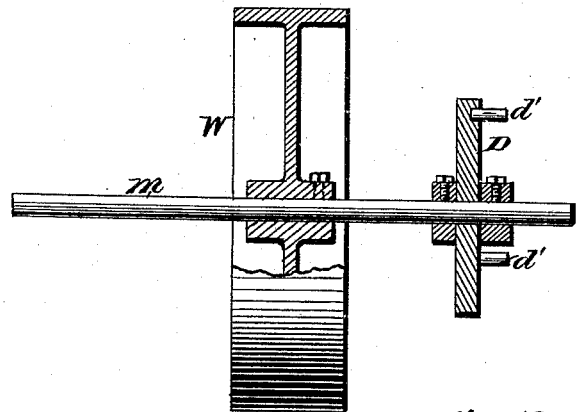
Figure 13:
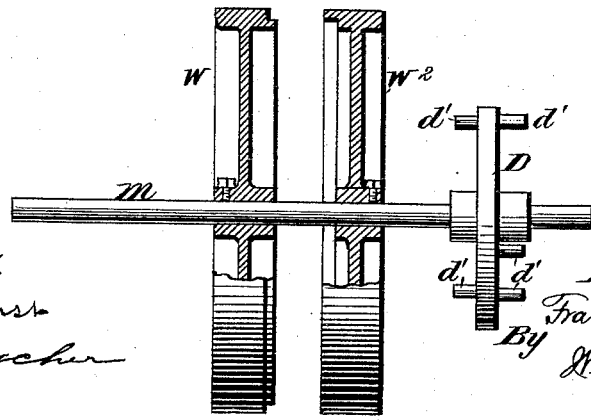

Figure 1 is a side elevation of my device, showing a portion of the concealed parts by dotted lines. Fig. 2 is a top plan view. Fig. 3 is an enlarged plan view in detail of the mechanism actuating the dropping-plate. Fig. 4 is a transverse vertical section of the seed-box and connections, showing the latter in elevation. Fig. 5 is a longitudinal section of the same parts. Fig. 6 is a plan view of the under side of the bottom of the seed-box. Fig. 7 is a vertical longitudinal section of the fertilizer-hopper and its valve. Fig. 8 is a perspective view of the covering-shovels and connections. Fig. 9 is a perspective view of the plow and mold-board, showing concealed parts and connections in dotted lines. Fig. 10 is a transverse vertical section through the ridge of the plow-beam. Fig. 11 is a perspective view of the mechanism for actuating the fertilizer-hopper valve and the dropping-plate of the seed-box. Fig. 12 is a vertical transverse section of the main driving-wheel, shaft, and disk. Fig. 13 is a vertical transverse section of a modified form of the driving-wheel.

M is a rectangular frame, near the rear end of which is mounted the main shaft $m$ in suitable bearings. This main shaft supports the drive-wheel W, which is attached to it by any suitable means. Near the front end of this rectangular frame is mounted a platform M', upon which is supported rigidly the seed-box S and the fertilizer-hopper F, both being stationary. At the rear end of the frame it is provided with handles H, supported by braces $h$ in any suitable manner. At the front end of the frame is secured the plow P, which is provided with a rearwardly-extending beam $p$, which rises from the ground slightly toward the rear and has at its farthest end two orifices or slots $p'$ and $p^2$, adapted to receive the chutes $s'$ and $s^2$, depending from the seed-box S. The beam $p$ at that portion of it designed to come vertically under the outlet of the fertilizer-chute $f$ is enlarged and extended upward, terminating in a sharp ridge $p^3$, with sloping sides $p^4$. On this beam $p$ are pivoted the wings or mold-boards P' by suitable means, as the bolts $p^5$, and capable of adjustment thereon. They are of the usual curved form common to machines of this class. Back of the mold-boards P' are placed the covering-shovels G. They are suspended from the main frame by means of two hangers I, which in turn support a cross-bar $i$, around which are placed straps $h'$, to which the coverers are secured by means of the bolts $h^2$. At the rear of the platform M' is suspended the rod G', to the lower end of which is secured a slotted cross-bar $g$, to which the rear ends of the shovels are attached by means of the nuts and bolts $g'$. A coiled spring $g^2$, passing around the rod G' and impinging against a plate $g^3$, attached to the main frame, serves to keep the shovels in constant contact with the ground. They are thus made laterally and vertically adjustable.

Firmly mounted upon the main shaft $m$ by any suitable means is the main drive wheel or roller W. This wheel is sometimes preferably made in two sections W' and W$^2$, which may be separately mounted on the main shaft and which causes a ridge of soil to be left in the space between the wheels when the machine is in motion. In order to secure a firm and close connection between the sections of the roller when placed together to form an unbroken rolling surface, the adjacent edges of their peripheries are complementarily rabbeted so as to fit nicely together and form a uniform cylindrical surface.

Alongside of the main drive-wheel W and also suitably secured to the shaft $m$ is the disk or wheel D, provided with pins $d'$, projecting from either side thereof at selected intervals. In the case shown the pins are placed in holes $d$ drilled in the disk. These pins, impinging against the ends of $a$ and $b$ of the links or connecting-rods A and B, cause the latter to move and oscillate the rock-shaft J through the crank J'. They are guided and supported by a plate $M^2$, attached to the platform M', which is provided with apertures A' and B', through which they pass. They are adjustably attached to the crank J' by means of the slots $a'$ and $b'$ and the bolts $a^2$ and $b^2$.

The rock-shaft J, which is suitably mounted in bearings on the main frame, has rigidly attached to it the fertilizer-hopper valve V, which oscillates with it. The rock-shaft J has secured to its opposite end a second crank $J^2$, adapted to receive a link C, to which is attached and operates a pawl C', curved at $c$ and pivoted at $c^2$ to the plate $C^2$, adapted to rotate around the spindle $S^2$ as a center. This plate is bent at right angles at $c^5$ (see Fig. 4) to admit of its passage through an aperture in the platform M', which is cut away at $m'$ for that purpose. It extends under the platform and swings around, or is journaled to the spindle $S^2$. The pawl C' engages with the toothed rim of the dropping-plate S', which centers and turns upon a vertical spindle $S^2$, suitably secured to the platform. The dropping-plate S' is provided with apertures $s$, which admit of the downward passage of the seed. The pivot $c^2$ is the fulcrum of the pawl C'. A button $c^4$, which is adapted to fit snugly into the curve of the pawl at $c$, is eccentrically pivoted upon the plate $C^2$ and may be thrown in or out of engagement with the pawl. When the former is the case, the pawl is rigidly maintained in position and cannot turn upon the pivot $c^2$. The platform M' is provided with suitable apertures $m^2$ and $m^3$, leading to the seed-chutes $s'$ and $s^2$, and which register with the holes $s$ in the dropping-plate.

The seed-box S is stationary and is attached to the platform M' by any suitable means. It is provided with a vertical longitudinal partition $S^3$, which divides it into two compartments, each of which may be filled with different kinds of seed. In the bottom of the seed-box two segmental slots $s^3$ are cut, one in each compartment, and the bottoms of the radial edges of the slots are provided with brushes $s^4$, of rubber or other suitable material. The spindle $S^2$ is the center of the seed-box and of the dropping-plate. The apertures in the latter are adapted to register with the segmental slots and the openings leading into the seed-chutes.

The fertilizer-hopper F, which is stationary and rigidly secured to the platform M', terminates at the bottom in a bowl or basin F', divided transversely into two compartments by means of two guides $F^2$ sloping in opposite directions. An aperture is cut in these guides and leads down to an opening $f'$, which opens down into the fertilizer-chute $f$. Access to this aperture $f^3$ and to the opening $f'$ is controlled by the valve V, which oscillates across its mouth, and is actuated by and rigidly attached to the rock-shaft J. This valve is composed of a semi-cylindrical piece V at its upper extremity and a rectangular piece V' at its lower extremity, terminating at the bottom in the curved surface $V^2$. It fits snugly against the edges $f^2$ and $f^4$ of the openings of the basin. Two cut-off slides $f^5$, made suitably adjustable, control the size of the apertures $f^3$.

The action of the machine is as follows: The forward motion of the machine, communicated by a horse or other power, causes the main drive-wheel W to turn. This rotates the shaft $m$ and imparts its motion to the disk D. The pins $d'$ on the edge of the disk impinge against the ends $a$ and $b$ of the links A and B, which communicate their motion to the rock-shaft J through the crank J', and cause it to oscillate, together with the valve V, attached to it. Through the crank $J^2$ a backward-and-forward motion is in turn given to the link C. If the button $c^4$ is out of engagement with the curve $c$ of the pawl C', the plate $C^2$ and the pawl are both moved. The pawl is caused to rotate around its pivot $c^2$ until it engages with the teeth on the rim of the dropping-plate, when it ceases to turn. The plate $C^2$, together with the dropping-plate, being thus connected to the link C, its forward motion causes them to rotate around the spindle $S^2$ until the limit of its stroke is reached. On the backward stroke the pawl at once turns on its pivot $c^2$, releases the tooth with which it was engaged, and the dropping-plate remains stationary until a forward stroke is again taken. Now if the button $c^4$ be placed in engagement with the pawl no change takes place in the motion of the parts on the forward stroke of the link C; but when the backward stroke commences the pawl cannot longer turn upon its pivot $c^2$, because the button $c^4$ is in the way, and as it remains in engagement with the teeth of the dropping-plate the said plate is dragged back with it, to move forward again with another forward stroke. It will be seen, therefore, that when the button $c^4$ is not engaged with the pawl an intermittent rotation of the dropping-plate is caused, but always in the same direction. When, however, the button $c^4$ is engaged with the pawl, the dropping-plate is caused to oscillate backward and forward around the spindle $S^2$ as a center. A continuous rotation will bring each hole in the dropping-plate in turn under the same segmental slot in the bottom of the seed-box, and then over the same aperture leading to the same feed-chute, so that if corn is placed in one compartment it will drop through the slot in that compartment onto the dropping-plate, and will remain there until the rotation of the plate brings one of the holes $s$ under the slot. It is then carried around bunched in the aperture until the latter is carried over the opening into the chutes which lead to the ground, when it falls. When the dropping-plate is reversed or oscillated, the seed in each compartment is alternately carried to the forward and backward chute. At the same time that the rock-shaft actuates the link C and the seed-box mechanism it causes the valve V to oscillate. The fertilizer-hopper being filled, the fertilizer drops into the basin F', where it is guided by the sides and the inclined guides $F^2$ toward the hole in the center in which the valve V plays. Supposing the valve V to be moved forward, as shown in Fig. 7, the fertilizer can then drop into the aperture $f^3$, and as the curved surface of the bottom $V^2$ of the valve closely touches the inner surface of the basin it cannot escape farther until the valve is oscillated in the reverse direction, when the flat under surface $V^3$ of the semi-cylindrical portion of the valve carries it down toward the aperture $f'$, from which it drops into the fertilizer-chute $f$. As the valve oscillates it is thus alternately delivering a measured portion of fertilizer from each side of the basin F', the amount delivered with each stroke being determined by the position of the slides $f^5$. When it is desired to deliver the fertilizer more rapidly or to "strew" it, more pins are set in the edge of the disk D and a more rapid motion of the links A and B and of the rock-shaft J and valve V is obtained. The advantage of being able to change the continuous intermittent rotation of the dropping-plate into an oscillating motion is that when two kinds of seed are used and one placed in each compartment of the seed-box with a rotation in one direction only, the delivery of the two kinds of seed is made simultaneously through the two seed-chutes. With an oscillating motion the delivery is made first of one seed and then of the other. The delivery from the seed-box can be made more deliberate, if desired, by stopping up a portion of the segmental slots $s^3$, or one or more of the holes $s$ in the dropping-plate.

Having thus described my invention, what I claim as new is—

1. In a machine of the class described, the horizontally and vertically adjustable covering-shovels G G, with means for securing them in their horizontally and vertically adjusted positions.

2. The combination of the frame M, support I, shovels G G, pivoted to said support, so as to swing both horizontally and vertically, the rod G' and cross-piece $g$, adjustably secured to the frame M, and means for adjustably securing the shovels to the cross-piece, substantially as shown and described.

3. In a machine of the class described, the wheel or roller W, composed of two sections W' and $W^2$, having the adjacent edges of their peripheries rabbeted, so that when brought together a close joint and a roller having a continuous cylindrical surface is formed, substantially as shown and described.

4. In a machine of the class described, a valve adapted to oscillate within the outlet of the fertilizer-hopper, consisting of a semi-cylindrical top, as V, adapted to close the upper entrance of said outlet, and a rectangular bottom V', adapted to close the lower entrance to said outlet, as and for the purposes described.

5. In a machine of the class described, a fertilizer-hopper having a basin-like bottom F', divided into parts by sloping guides, as $F^2$, and provided with an aperture, the size of which can be increased or diminished by means of adjustable plates, as $f^5$, secured to the sides of the guides $F^2$, as and for the purposes described.

6. The combination of the rock-shaft J, actuated by the main drive-wheel through intermediate mechanism, with the crank $J^2$, the link C, the pawl C', and the dropping-plate S', having a toothed periphery.

7. The combination of the link C, the pawl C', the oscillating plate $C^2$, carrying said pawl, and the toothed dropping-plate S', substantially as shown and described.

8. The combination of the link C, the pawl C', the oscillating plate $C^2$, carrying said pawl, the toothed dropping-plate S', and means for holding the pawl in engagement with the toothed dropping-plate, substantially as shown and described.

9. The combination, with the link C, to which a reciprocal motion may be imparted, of the pawl C', curved at $c$ and pivoted at $c^2$ to the plate $C^2$, the eccentric button $c^4$, adapted to engage with the said pawl, the plate $C^2$, and the dropping-plate S', the said plate and dropping-plate adapted to swing around the same center, as and for the purposes described.

10. The combination, with the fertilizer-hopper F, stationary upon the main frame, of the rock-shaft J and oscillating valve V, the link C and pawl C' and its means of adjustment, the dropping-plate $S^2$, and the seed-box S, the said fertilizer-hopper and seed-box having suitable outlet-apertures.

11. The combination of the links A and B, actuated from the main drive wheel or roller W, with the crank J', the rock-shaft J, carrying the oscillating valve V, the fertilizer-hopper F, the link C, pawl C', sliding plate $c^2$, button $c^4$, the dropping-plate S', and seed-box S.

12. The plow P, having the beam $p$, terminating in the ridge $p^3$ and sloping sides $p^4$, and provided with the apertures $p'$ and $p^2$, as and for the purposes described.

13. The combination, with the plow P, having the beam $p$, ridge $p^3$, and apertures $p'$ and $p^2$, of the fertilizer-hopper F and valve V, and seed-box S and dropping-plate S', as and for the purposes described.

In witness whereof I have hereunto affixed my signature in the presence of two witnesses.

FRANK P. HOWARD.

Witnesses:
 ARTHER JORDAN,
 AUGUSTUS H. WALKER.